(12) United States Patent
Mori

(10) Patent No.: US 7,397,654 B2
(45) Date of Patent: Jul. 8, 2008

(54) UNINTERRUPTIBLE POWER SUPPLY AND METHOD OF MANUFACTURING SAME

(75) Inventor: Kenneth Mori, Los Angeles, CA (US)

(73) Assignee: Belkin International Inc., Compton, CA (US)

( * ) Notice: Subject to any disclaimer, the term of this patent is extended or adjusted under 35 U.S.C. 154(b) by 374 days.

(21) Appl. No.: 11/147,596

(22) Filed: Jun. 7, 2005

(65) Prior Publication Data

US 2006/0284488 A1    Dec. 21, 2006

(51) Int. Cl.
  *H05K 5/02* (2006.01)
  *H02J 7/02* (2006.01)
  *F21L 4/00* (2006.01)

(52) U.S. Cl. ............... 361/679; 361/601; 320/114; 320/115; 362/183; 362/276; 362/802

(58) Field of Classification Search ............... 361/601, 361/679; 320/114, 115; 362/183, 276, 802
See application file for complete search history.

(56) References Cited

U.S. PATENT DOCUMENTS

| | | | |
|---|---|---|---|
| 5,359,540 A * | 10/1994 | Ortiz | 700/295 |
| 5,908,233 A * | 6/1999 | Heskett et al. | 362/183 |
| 6,476,729 B1 * | 11/2002 | Liu | 340/870.11 |
| 6,811,281 B1 | 11/2004 | Hsiao | |
| 6,894,622 B2 * | 5/2005 | Germagian et al. | 340/693.5 |
| 6,948,972 B2 | 9/2005 | Laukhuf | |
| 7,109,683 B2 * | 9/2006 | Parker | 320/114 |
| 7,154,402 B2 * | 12/2006 | Dayoub | 340/628 |
| 7,239,892 B2 * | 7/2007 | Martin | 455/557 |
| 2002/0158605 A1 * | 10/2002 | Sharrah et al. | 320/115 |
| 2004/0090774 A1 * | 5/2004 | Hsueh | 362/183 |
| 2004/0142601 A1 | 7/2004 | Luu | |
| 2006/0121787 A1 * | 6/2006 | Bhavnani | 439/638 |

\* cited by examiner

*Primary Examiner*—Anatoly Vortman
(74) *Attorney, Agent, or Firm*—Bryan Cave LLP

(57) ABSTRACT

An uninterruptible power supply comprises a power source (250) and a housing (110) to contain the power source. The housing comprises an outer surface (111) in which are located a recess (121) and a flat region (231). An electrical outlet (241) is located at the flat region, and a light source (130) is removably housed in the recess. The power source is capable of supplying electric power to the electrical outlet in response to a condition external to the uninterruptible power supply.

27 Claims, 5 Drawing Sheets

UNINTERRUPTIBLE POWER SUPPLY AND METHOD OF MANUFACTURING SAME

FIELD OF THE INVENTION

This invention relates generally to uninterruptible power supplies, and relates more particularly to uninterruptible power supplies having enhanced visibility features.

BACKGROUND OF THE INVENTION

Uninterruptible power supplies have been developed to supply backup power in the event of an interruption in the mains power supply. In general, uninterruptible power supplies contain a power source such as a battery that is capable of operating independently of the mains power supply, and that is further capable of supplying electric power to electronic devices and the like. Typically, an uninterruptible power supply routes mains power through the battery and to the electrical outlet during normal operation of the mains power supply, thereby charging the battery, and automatically switches to battery power during a mains power outage or other interruption in mains power.

Because uninterruptible power supplies are designed to perform particular functions during power interruptions, it follows that the performance of such functions may often take place in a dimly lit or darkened area. Accordingly, there exists a need for an uninterruptible power supply that is capable of enhancing visibility in the area in which the uninterruptible power supply is located.

BRIEF DESCRIPTION OF THE DRAWINGS

The invention will be better understood from a reading of the following detailed description, taken in conjunction with the accompanying figures in the drawings in which.

Figure 1:
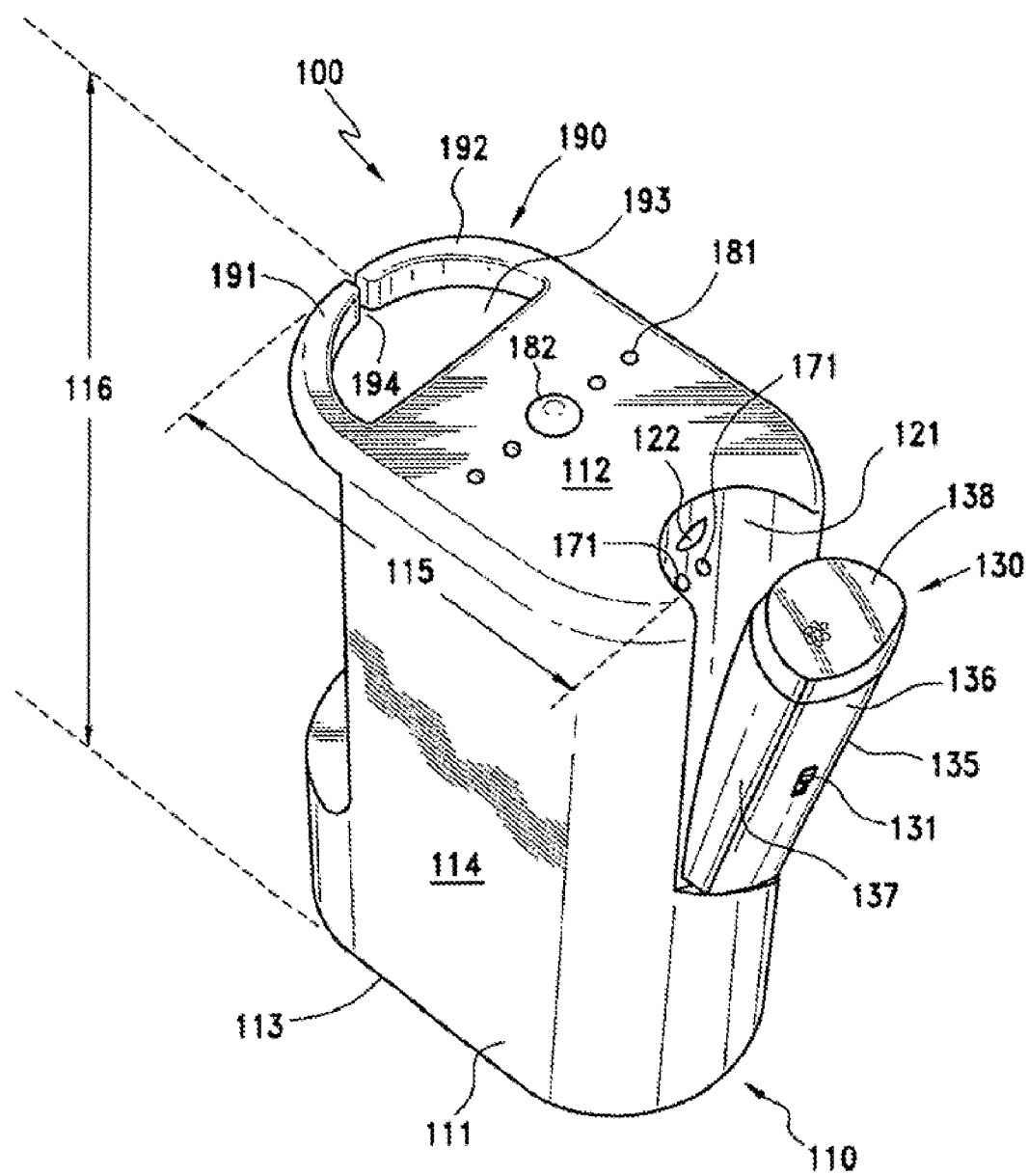
FIG. 1 is a perspective view of an uninterruptible power supply according to an embodiment of the invention.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under,"in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical, mechanical, or other manner.

DETAILED DESCRIPTION OF THE DRAWINGS

In one embodiment of the invention, an uninterruptible power supply comprises a power source and a housing to contain the power source. The housing comprises an outer surface in which are located a recess and a flat region. An electrical outlet is located at the flat region, and a light source is removably housed in the recess. The power source is capable of supplying electric power to the electrical outlet in response to a condition external to the uninterruptible power supply.

Figure 2:
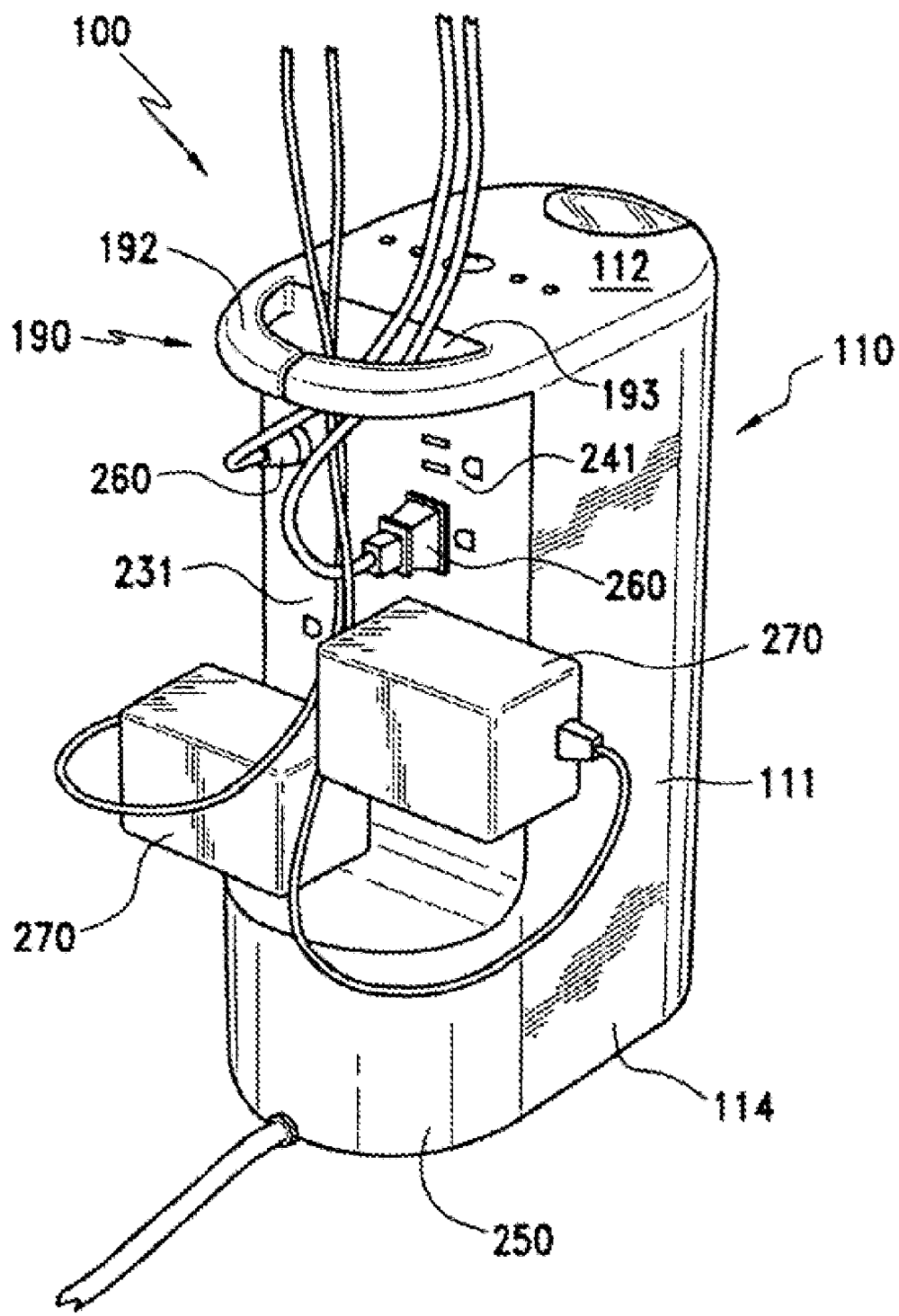
FIG. 2 is a perspective view of the uninterruptible power supply as seen from a different vantage point.

Referring now to the figures, FIG. 1 is a perspective view of an uninterruptible power supply 100 according to an embodiment of the invention, and FIG. 2 is a perspective view of uninterruptible power supply 100 from a different vantage point according to an embodiment of the invention. As illustrated in FIGS. 1 and 2, uninterruptible power supply 100 comprises a housing 110 containing a power source 250 (only an exterior surface of which is shown in FIG. 2). Power source 250, which in at least one embodiment is a rechargeable battery, is capable of providing backup electric power, such as direct current power, in response to a condition external to uninterruptible power supply 100. As an example, the external condition can be an interruption in the mains power supply.

Housing 110 has an outer surface 111 that comprises a recess 121 and a flat region 231 that in the illustrated embodiment is generally opposite recess 121 but that in a different embodiment may be located elsewhere on housing 110. In the illustrated embodiment, recess 121 contains a charging contact 171. An electrical outlet 241 is located at flat region 231. In the illustrated embodiment, electrical outlet 241 is one of a plurality of electrical outlets located at flat region 231. Because each one of such plurality of electrical outlets is similar to each other one of such plurality of electrical outlets, the phrase "electrical outlet 241" will be use herein to indicate one of, a group of, or all of the electrical outlets at flat region 231, as indicated by the context.

In the illustrated embodiment, housing 110 has a roughly cylindrical shape such that outer surface 111 further comprises a substantially flat top surface 112, a substantially flat bottom surface 113 (only an edge of which is visible in the figures) spaced apart from top surface 112, and a curved side surface 114 in which recess 121 and flat region 231 are located. As shown, curved side surface 114 separates top surface 112 and bottom surface 113 from each other. Top surface 112 has a length 115. Curved side surface 114 has a length 116. Top surface 112 and bottom surface 113 are separated, therefore, by length 116.

As illustrated in FIG. 1, light source 130 comprises a curved outer surface 135 comprising a portion 136 and a portion 137. Light source 130 comprises a lens 138 that forms a portion of top surface 112, as shown.

It may sometimes be desirable that uninterruptible power supply 100 have a minimal footprint such that uninterruptible power supply 100 occupies a relatively small area of space on the floor, desk, or other surface on which uninterruptible power supply 100 rests. Accordingly, in the illustrated embodiment, length 116 exceeds length 115 by at least a factor of two. The described geometry is that of an uninterruptible power supply having a tall, slender form factor.

A visual indicator 181 and a switch 182 are located at top surface 112. (In a different embodiment, visual indicator 181 and/or switch 182 may be located elsewhere on housing 110). Visual indicator 181, which for example can be a light-emitting diode (LED), may indicate, either by itself or in conjunction with additional indicators, such conditions as normal mains power operation, battery backup power operation, overload status, battery fault, and the like. Switch 182 may be, for example, an on/off switch for uninterruptible power supply 100, a reset button, a switch that controls light source 130, or the like.

As an example, each one of electrical outlets 241 receive electric power from the mains power supply during normal operation of the mains power supply, and from power source 250 during an interruption of the mains power supply. Plugs 260 and power bricks 270 are inserted into one of electrical outlets 241 and are thereby electrically coupled to mains power and to backup power supplied by power source 250. In one embodiment, fewer than all of electrical outlets 241 are electrically coupled to power source 250. In that embodiment, a plug or power brick plugged into one of the electrical outlets not electrically coupled to power source 250 will not receive electric power during an interruption in mains power supply. Accordingly, a plug or power brick connected to an electronic device whose operation is non-essential or of lesser importance would typically be inserted into one of the electrical outlets not electrically coupled to power source 250, leaving the electrical outlets that are electrically coupled to power source 250 for plugs or power bricks that are connected electronic devices whose operation is essential or of greater importance.

Uninterruptible power supply 100 further comprises a cord management feature 190 adjacent to flat region 231. Cord management feature 190 comprises an arm 191 and an arm 192 opposing arm 191, as shown. Arms 191 and 192 form an extension of top surface 112, and define a space 193 therebetween that is capable of managing and organizing cables, cords, wires, and the like in a manner such as that shown in a subsequent figure. In one embodiment, cord management feature 190 if formed from a plastic or an elastomer, comprises a gap 194 between arms 191 and 192, and is flexible so as to allow cords and the like to pass into and out of space 193. In another embodiment, arms 191 and 192 are continuous so as to form a single arm without a gap, and an end of the cord or the like must be inserted into or removed from space 193.

Uninterruptible power supply 100 further comprises a light source 130 capable of being removably housed in recess 121. As an example, light source 130 is a flashlight. In the illustrated embodiment, housing 110 further comprises a retention mechanism 122 that is capable of retaining light source 130 in recess 121. As an example, retention mechanism 122 can comprise a spring latch or other latch, a hook, a clip, a magnetic catch or other magnetic retainer, or a rail system in which light source 130 slides along the rails as it is inserted into and removed from recess 121. As another example, retention mechanism 122 can comprise a mechanism in which light source 130 is maintained in recess 121 via an interference or friction fit, via the operation of gravity, or the like.

In one embodiment, light source 130 automatically illuminates when power source 250 supplies electric power to electrical outlet 241. Appropriate circuitry and/or other components capable of causing such automatic illumination are known in the art, and are thus not further described herein. An advantage of the embodiment just described is that light source 130 provides illumination during an interruption of mains power, when normally-available sources of illumination are out of service. During such times, light source 130 may be used, for example, in order to locate uninterruptible power supply 100 or in order to provide illumination for some other purpose.

In one embodiment light source 130 is illuminated only while power source 250 supplies electric power to electrical outlet 241. In another embodiment, light source 130 is controllable such that it may be illuminated or extinguished without regard for or independently of the state of operation of the mains power supply and power source 250. As an example, switch 182 may provide such control. As another example, light source 130 may comprise a switch, such as an on/off switch 131, that provides such control. In one embodiment, on/off switch 131 is capable of overriding switch 182. An advantage of an independent control for light source 130 is that light source 130 may then be illuminated, thereby providing light underneath a computer desk, for example, even during times when the mains power supply is operating normally.

Figure 3:
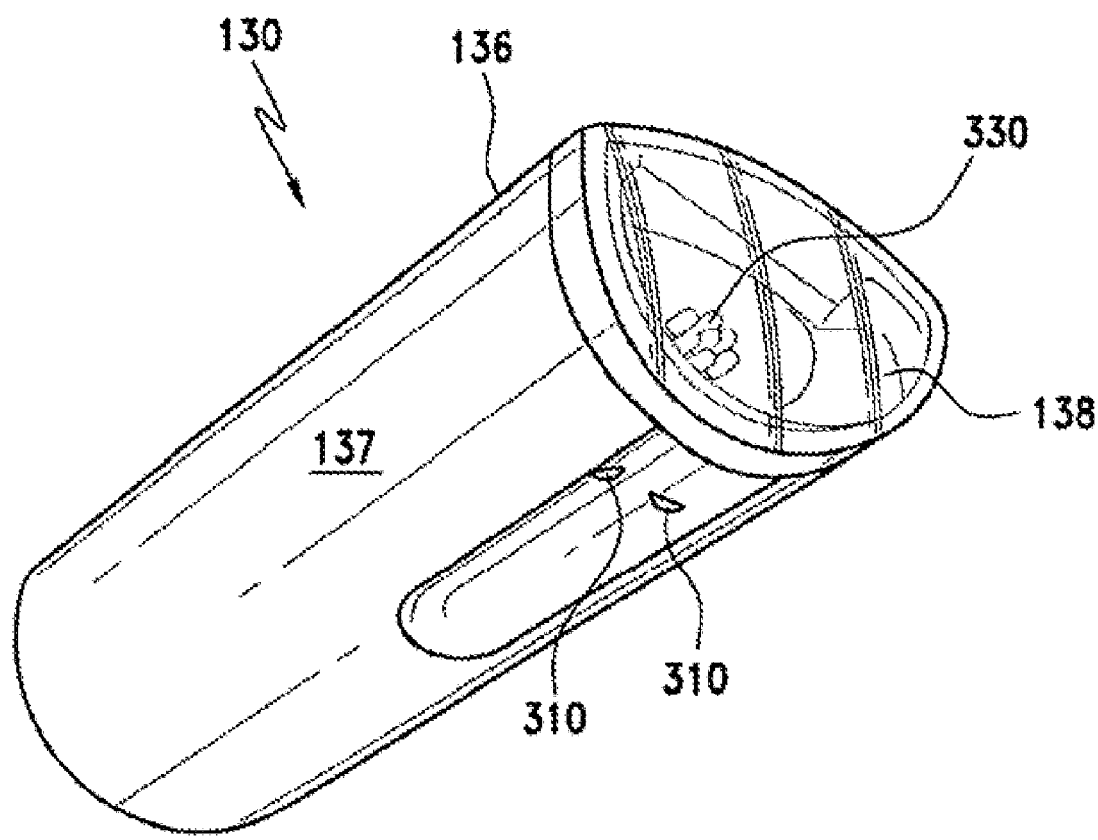
FIG. 3 is a perspective view of a light source capable of being removably housed in a recess of the uninterruptible power supply according to an embodiment of the invention.

FIG. 3 is a perspective view of light source 130 according to an embodiment of the invention. Light source 130 contains a rechargeable battery that is not shown in the drawings. In a preferred embodiment, the rechargeable battery is sealed in an interior of light source 130.

Figure 4:
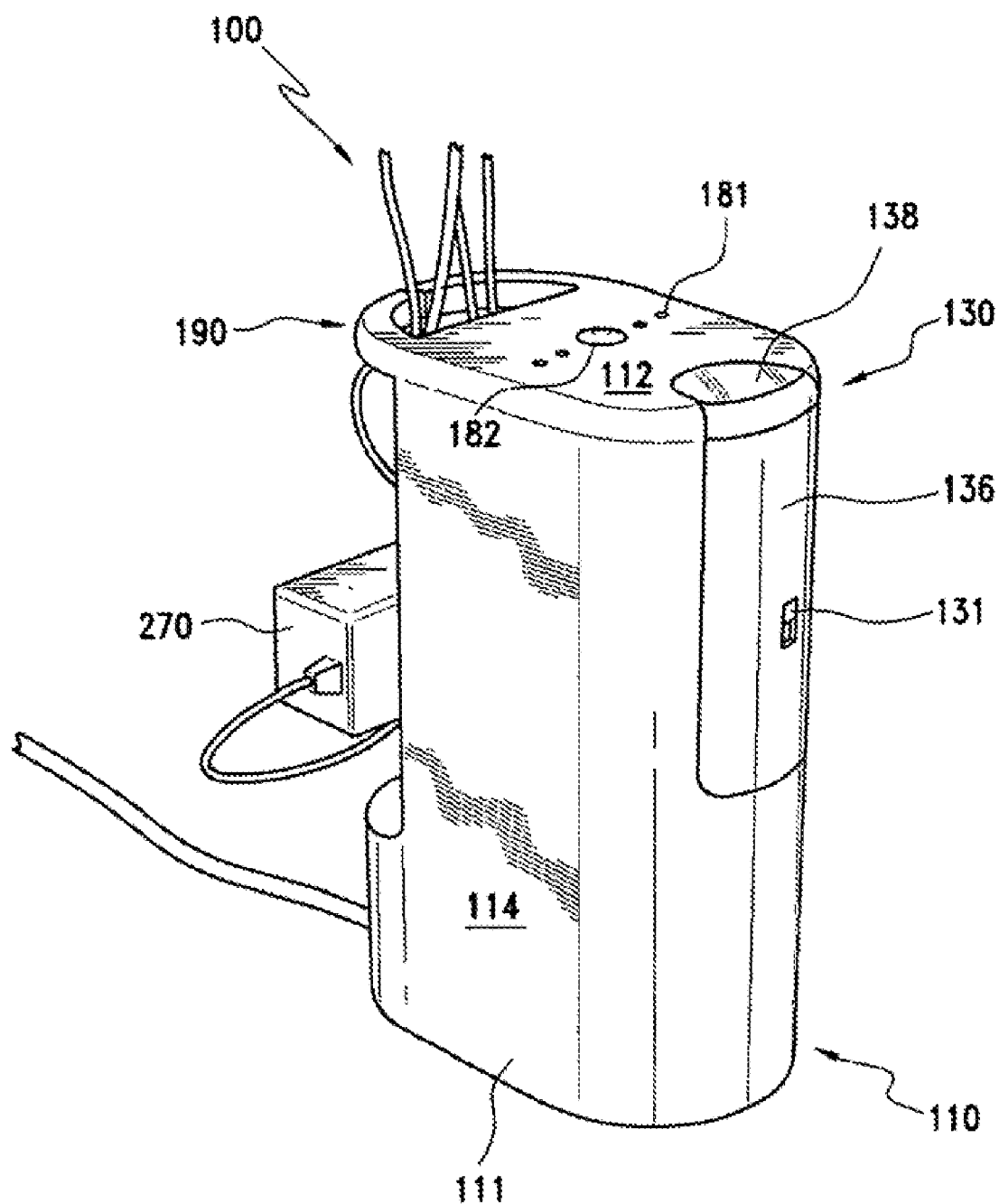
FIG. 4 is a perspective view of the uninterruptible power supply showing the light source housed in the recess.

It was mentioned above in connection with FIG. 1 that light source 130 comprises curved outer surface 135 comprising portion 136 and portion 137. Portion 137 mates with or fits snugly into recess 121 and has a charging contact 310 thereon. Portion 136 forms a portion of outer surface 111 of housing 110 when light source 130 is housed in recess 121. An example of how portion 136 forms a portion of outer surface 111 is depicted in FIG. 4, which is a perspective view of uninterruptible power supply 100 showing light source 130 housed in recess 121. Charging contact 310 is physically and electrically coupled to charging contact 171 when light source 130 is housed in recess 121. The rechargeable battery inside light source 130 is recharged, taking power from power source 250 and/or the mains power source, when charging contact 171 and charging contact 310 are coupled as described. As an example, charging contacts 171 and 310 can be similar to the charging contacts frequently employed in connection with a cordless telephone.

Light source 130 further comprises a bulb 330, which in one embodiment can be a standard light bulb containing a filament, and in another embodiment can be an LED. An advantage of using an LED for bulb 330 is that LEDs are typically more energy efficient, generate less heat, and last longer than light bulbs with filaments.

Figure 5:
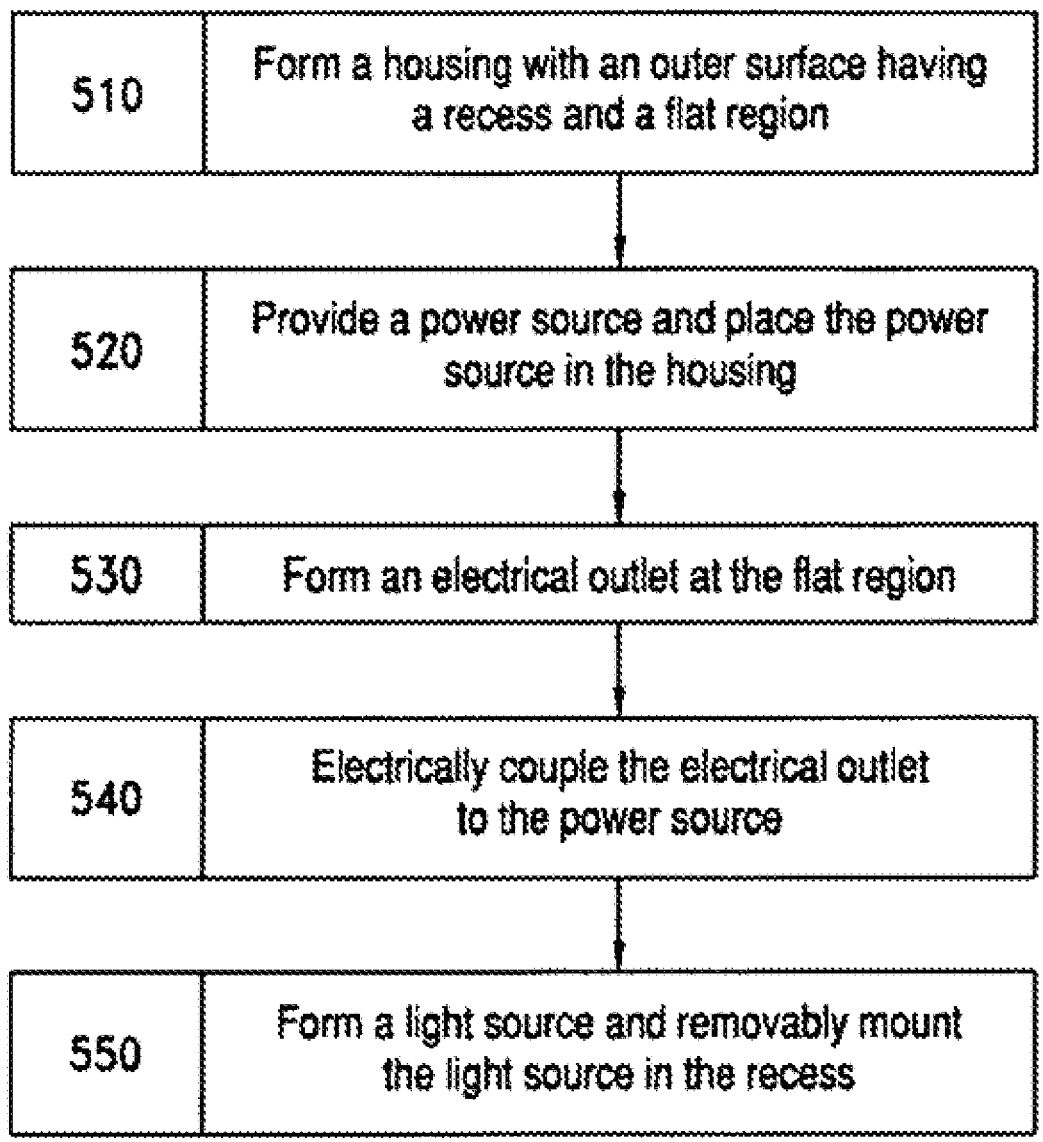
FIG. 5 is a flowchart illustrating a method of manufacturing an uninterruptible power supply according to an embodiment of the invention.

FIG. 5 is a flowchart illustrating a method 500 of manufacturing an uninterruptible power supply according to an embodiment of the invention. A step 510 of method 500 is to form a housing with an outer surface having a recess and a flat region. As an example, the housing, the recess, and the flat region can be similar to, respectively, housing 110, recess 121, both of which were first shown in FIG. 1, and flat region 231, first shown in FIG. 2. In one embodiment, step 510 can be performed as part of an injection molding process as known in the art. In another embodiment, step 510 can be performed as part of sheet metal shaping process in which a quantity of sheet metal or the like is stamped, bent, formed, rolled, and/or welded, as known in the art.

A step 520 of method 500 is to provide a power source and place the power source in the housing. As an example, the power source can be similar to power source 250, first shown in FIG. 2.

A step 530 of method 500 is to form an electrical outlet at the flat region. As an example, the electrical outlet can be similar to electrical outlet 241, first shown in FIG. 2.

A step 540 of method 500 is to electrically couple the electrical outlet to the power source.

A step 550 of method 500 is to form a light source and removably mount the light source in the recess. In one embodiment, step 550 or another step comprises forming an outer flashlight surface and aligning the outer flashlight surface with the outer surface of the housing.

Although the invention has been described with reference to specific embodiments, it will be understood by those skilled in the art that various changes may be made without departing from the spirit or scope of the invention. Various examples of such changes have been given in the foregoing description. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the uninterruptible power supply discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment of the invention, and may disclose alternative embodiments of the invention.

All elements claimed in any particular claim are essential to the invention claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. An uninterruptible power supply comprising:
a housing containing a first rechargeable battery and comprising:
an outer surface comprising a recess and a flat region;
a first charging contact in the recess;
a plurality of electrical outlets at the flat region; and
a flashlight capable of being removably housed in the recess,
wherein:
the flashlight contains a second rechargeable battery and comprises:
an on/off switch;
a curved outer surface comprising a first portion and a second portion; and
a second charging contact at the second portion;
the second charging contact is physically and electrically coupled to the first charging contact when the flashlight is housed in the recess; and
the first portion of the curved outer surface forms a portion of the outer surface of the housing when the flashlight is housed in the recess.

2. The uninterruptible power supply of claim 1 wherein:
the housing has a cylindrical shape such that the outer surface further comprises:
a substantially flat top surface;
a substantially flat bottom surface; and
a curved side surface in which the recess and the flat region are located.

3. The uninterruptible power supply of claim 2 wherein:
the top surface has a first length;
the bottom surface has the first length;
the curved side surface has a second length, which second length separates the top surface and the bottom surface from each other; and
the second length exceeds the first length by at least a factor of two.

4. The uninterruptible power supply of claim 2 wherein:
the flashlight comprises a lens; and
the lens forms a portion of the top surface.

5. The uninterruptible power supply of claim 1 further comprising:
a cord management feature adjacent to the flat region.

6. The uninterruptible power supply of claim 5 wherein:
the cord management feature comprises a first arm and a second arm opposing the first arm;
the first arm and the second arm define a space therebetween; and
the first arm and the second arm form an extension of the top surface.

7. The uninterruptible power supply of claim 5 wherein:
the housing further comprises a retention mechanism; and
the retention mechanism is capable of retaining the flashlight in the recess.

8. The uninterruptible power supply of claim 1 wherein:
the flashlight automatically illuminates when the first rechargeable battery supplies electric power to at least one of the plurality of electrical outlets.

9. The uninterruptible power supply of claim 8 wherein:
the on/off switch is capable of controlling the flashlight independently of an operation of the first rechargeable battery.

10. The uninterruptible power supply of claim 9 further comprising:
a switch at the housing capable of controlling the flashlight independently of the operation of the first rechargeable battery.

11. The uninterruptible power supply of claim 10 wherein:
the on/off switch is capable of overriding the switch at the housing.

12. An uninterruptible power supply comprising:
a housing containing a first rechargeable battery and comprising:
an outer surface comprising a recess and a first region;
an electrical outlet at the first region; and
a first charging contact; and
a flashlight comprising a second charging contact and containing a second rechargeable battery coupled to the second charging contact;

wherein:
the flashlight is configured to be removably housed in the recess;
the second charging contact is configured to be coupled to the first charging contact when the flashlight is housed in the recess;
the first rechargeable battery is configured to supply electric power to the electrical outlet when the first rechargeable battery does not receive power; and
the flashlight is configured to automatically illuminate when the first rechargeable battery supplies electric power to the electrical outlet.

13. The uninterruptible power supply of claim 12 wherein:
the flashlight is configured to automatically illuminate only when the first rechargeable battery supplies electric power to the electrical outlet.

14. The uninterruptible power supply of claim 12 wherein:
the housing has a cylindrical shape such that the outer surface further comprises:
  a substantially flat top surface;
  a substantially flat bottom surface spaced apart from the top surface; and
  a curved side surface configured to separate the top surface and the bottom surface from each other;
the recess and the first region are located at the curved side surface; and
the uninterruptible power supply further comprises at least one of a visual indicator and a switch at the top surface.

15. The uninterruptible power supply of claim 12 wherein:
the flashlight is configured to automatically illuminate when the first rechargeable battery does not receive power.

16. The uninterruptible power supply of claim 12 wherein:
the flashlight is configured to automatically illuminate only when the first rechargeable battery does not receive power.

17. The uninterruptible power supply of claim 12, further comprising:
a connection to a main power supply;
wherein the flashlight is configured to automatically illuminate during an interruption of the main power supply.

18. The uninterruptible power supply of claim 12, further comprising:
a connection mechanism configured to couple to a main power supply;
wherein the first rechargeable battery is rechargeable via the connection mechanism.

19. The uninterruptible power supply of claim 12, wherein:
the first rechargeable battery is coupled to the first charging contact; and
the second rechargeable battery is rechargeable by the first rechargeable battery when the second charging contact is coupled to the first charging contact.

20. The uninterruptible power supply of claim 12, further comprising:
a connection mechanism configured to couple to a main power supply; wherein:
  the connection mechanism is coupled to the first charging contact; and
  the second rechargeable battery is rechargeable via the connection mechanism when the second charging contact is coupled to the first charging contact.

21. The uninterruptible power supply of claim 12, further comprising:
a visual indicator;
wherein the visual indicator identifies conditions comprising at least one of:
  a normal main power operation;
  a battery backup power operation;
  an overload status; and
  a battery fault.

22. The uninterruptible power supply of claim 12, wherein:
the flashlight further comprises a flashlight switch
the housing further comprises a housing switch; and
the housing switch is selected from the group consisting essentially of:
  an on/off control;
  a reset control;
  a flashlight control; and
  a visual indicator control.

23. The uninterruptible power supply of claim 22, wherein:
the flashlight switch is capable of overriding the housing switch.

24. The uninterruptible power supply of claim 22, wherein:
the housing switch is capable of overriding the flashlight switch.

25. The uninterruptible power supply of claim 22, further comprising:
a connection to a main power supply;
wherein the flashlight switch is capable of controlling the flashlight without regards to the connection to the main power supply.

26. The uninterruptible power supply of claim 12 further comprising:
a cord management feature adjacent to the first region; wherein:
  the cord management feature comprises a first arm and a second arm opposing the first arm; and
  the first arm and the second arm define a space therebetween.

27. The uninterruptible power supply of claim 12, further comprising:
a secondary electrical outlet at the first region;
wherein the secondary electrical outlet is not configured to be powered by the first rechargeable battery.

* * * * *